United States Patent
Zhang et al.

(10) Patent No.: US 11,947,427 B2
(45) Date of Patent: Apr. 2, 2024

(54) METHOD, ELECTRONIC DEVICE, AND COMPUTER PROGRAM PRODUCT FOR STORAGE MANAGEMENT USING BLOCKCHAIN

(71) Applicant: EMC IP Holding Company LLC, Hopkinton, MA (US)

(72) Inventors: Simon Yuting Zhang, Chengdu (CN); Yizhou Zhou, Chengdu (CN); Aaron Chao Lin, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 96 days.

(21) Appl. No.: 16/871,846

(22) Filed: May 11, 2020

(65) Prior Publication Data
US 2021/0263809 A1    Aug. 26, 2021

(30) Foreign Application Priority Data
Feb. 26, 2020    (CN) .......................... 202010119587.3

(51) Int. Cl.
*G06F 11/14*    (2006.01)
*G06F 16/23*    (2019.01)
(Continued)

(52) U.S. Cl.
CPC ...... *G06F 11/1464* (2013.01); *G06F 11/1451* (2013.01); *G06F 11/1461* (2013.01);
(Continued)

(58) Field of Classification Search
CPC ............. G06F 11/1464; G06F 11/1451; G06F 11/1461; G06F 11/1469; G06F 16/2322;
(Continued)

(56) References Cited

U.S. PATENT DOCUMENTS 10,255,460 B2 *    4/2019    Wilson ............... H04N 1/32133
10,484,174 B1 *    11/2019    Bernat .................... H04L 9/321
(Continued)

FOREIGN PATENT DOCUMENTS

| CN | 1606010 A |   | 4/2005 |
|---|---|---|---|
| CN | 103885986 A | * | 6/2014 |
| CN | 109598144 A |   | 4/2019 |
| CN | 110084062 A |   | 8/2019 |
| CN | 110674532 A |   | 1/2020 |

*Primary Examiner* — Charles Rones
*Assistant Examiner* — Alexander Vinnitsky
(74) *Attorney, Agent, or Firm* — WOMBLE BOND DICKINSON (US) LLP

(57) ABSTRACT

A method, an electronic device, and a computer program product for storage management are provided. The method includes: acquiring a lock attribute record in a lock attribute record chain from a data protection network for backing up data, data protection servers of the data protection network reaching a consensus on the lock attribute record chain, the lock attribute record including a first attribute value of an attribute of a lock operation, the lock operation being used for preventing a backup of the data stored in a storage server from being tampered with; acquiring, based on the lock attribute record, a second attribute value of the attribute of the lock operation from the storage server; and generating, based on determining that the first attribute value does not match the second attribute value, an alarm indicating that the backup is tampered with. This solution can better prevent data from being tampered with.

20 Claims, 6 Drawing Sheets

(51) Int. Cl.
*G06F 21/60* (2013.01)
*G06F 21/78* (2013.01)
*G06F 21/88* (2013.01)

(52) U.S. Cl.
CPC ...... *G06F 11/1469* (2013.01); *G06F 16/2322* (2019.01); *G06F 21/602* (2013.01); *G06F 21/78* (2013.01); *G06F 21/88* (2013.01)

(58) Field of Classification Search
CPC ........ G06F 21/602; G06F 21/78; G06F 21/88; G06F 21/6218; G06F 11/1446; G06F 21/552; G06F 16/1774; G06F 16/1734; G06F 21/64
See application file for complete search history.

(56) References Cited

U.S. PATENT DOCUMENTS

| | | | |
|---|---|---|---|
| 2018/0025135 A1* | 1/2018 | Odom | H04L 63/08 726/28 |
| 2018/0075262 A1* | 3/2018 | Auh | G06F 16/258 |
| 2018/0300207 A1* | 10/2018 | Zhang | G06F 11/1469 |
| 2019/0354708 A1* | 11/2019 | Fisher | G06F 3/0623 |
| 2019/0356609 A1* | 11/2019 | Grunwald | H04L 49/356 |
| 2020/0000143 A1* | 1/2020 | Anderson | A24F 40/50 |
| 2020/0028672 A1* | 1/2020 | Tang | H04L 9/3297 |
| 2020/0351310 A1* | 11/2020 | Leighton | H04L 9/3234 |
| 2021/0240570 A1* | 8/2021 | Upadhyay | G06F 16/128 |

\* cited by examiner

METHOD, ELECTRONIC DEVICE, AND COMPUTER PROGRAM PRODUCT FOR STORAGE MANAGEMENT USING BLOCKCHAIN

CROSS-REFERENCE TO RELATED APPLICATION

This patent application claims priority, under 35 U.S.C. § 119, of Chinese Patent Application No. 202010119587.3, filed Feb. 26, 2020, which is incorporated by reference in its entirety.

TECHNICAL FIELD

Embodiments of the present disclosure generally relate to computer technologies, and specifically to a method, an electronic device, and a computer program product for storage management.

BACKGROUND

Enterprises of various industries keep observing exponential growth of structured and unstructured data, which consumes most of expensive primary storage systems of these enterprises. However, as the data becomes outdated, most data will not be frequently accessed. Therefore, it is less efficient to store these infrequently accessed cold data and frequently accessed hot data in the same primary storage system. A conventional method is to move cold data into a secondary storage system or an archive storage system to save cost. However, for important industries such as governments, banking, stock markets, and military industry, due to company management and regulatory compliance standards, cold data should not be modified or deleted within a designated period of time. As a result, a retention lock technology is introduced for the cold data or archived data. Retention lock means to lock data within a designated period of time so that the data is invariable, and therefore may also be interchangeably referred to as "lock" for short herein. The retention lock technology provides invariable data lock and safe data retention functions to satisfy extensive corporate governance and regulatory compliance standards. However, conventional retention lock technologies are relatively not reliable, such that the data may be tampered with.

SUMMARY OF THE INVENTION

Embodiments of the present disclosure provide a method, an electronic device, and a computer program product for storage management.

In a first aspect of the present disclosure, a method for storage management is provided. The method includes: acquiring a lock attribute record in a lock attribute record chain from a data protection network for backing up data, a plurality of data protection servers of the data protection network reaching a consensus on the lock attribute record chain, the lock attribute record including a first attribute value of an attribute of a lock operation, the lock operation being used for preventing a backup of the data stored in a storage server from being tampered with; acquiring, based on the lock attribute record, a second attribute value of the attribute of the lock operation from the storage server; and generating, based on determining that the first attribute value does not match the second attribute value, an alarm indicating that the backup is tampered with.

In a second aspect of the present disclosure, a method for storage management is provided. The method includes: receiving, at a first data protection server among a plurality of data protection servers of a data protection network for backing up data, a first lock request for a first backup of a first piece of data stored in a storage server from a second data protection server among the plurality of data protection servers, the first lock request being used for requesting execution of a lock operation preventing the first backup from being tampered with and comprising an attribute value of an attribute of the lock operation; creating a lock attribute record based on the first lock request, the plurality of data protection servers reaching a consensus on the lock attribute record; and sending a response that is for the first lock request and is associated with the lock attribute record to the second data protection server.

In a third aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to execute an action, the action including: acquiring a lock attribute record in a lock attribute record chain from a data protection network for backing up data, a plurality of data protection servers of the data protection network reaching a consensus on the lock attribute record chain, the lock attribute record including a first attribute value of an attribute of a lock operation, the lock operation being used for preventing a backup of the data stored in a storage server from being tampered with; acquiring, based on the lock attribute record, a second attribute value of the attribute of the lock operation from the storage server; and generating, based on determining that the first attribute value does not match the second attribute value, an alarm indicating that the backup is tampered with.

In a fourth aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to execute an action, the action including: receiving, at a first data protection server among a plurality of data protection servers of a data protection network for backing up data, a first lock request for a first backup of a first piece of data stored in a storage server from a second data protection server among the plurality of data protection servers, the first lock request being used for requesting execution of a lock operation preventing the first backup from being tampered with and comprising an attribute value of an attribute of the lock operation; creating a lock attribute record based on the first lock request, the plurality of data protection servers reaching a consensus on the lock attribute record; and sending a response that is for the first lock request and is associated with the lock attribute record to the second data protection server.

In a fifth aspect of the present disclosure, a computer program product is provided. The computer program product is tangibly stored on a non-transient computer-readable medium and includes machine-executable instructions. The machine-executable instructions, when executed, cause a machine to execute an action, the action including: acquiring a lock attribute record in a lock attribute record chain from a data protection network for backing up data, a plurality of data protection servers of the data protection network reaching a consensus on the lock attribute record chain, the lock attribute record including a first attribute value of an attribute of a lock operation, the lock operation being used for preventing a backup of the data stored in a storage server from being tampered with; acquiring, based on the lock attribute record, a second attribute value of the attribute of the lock operation from the storage server; and generating, based on determining that the first attribute value does not match the second attribute value, an alarm indicating that the backup is tampered with.

In a sixth aspect of the present disclosure, a computer program product is provided. The computer program product is tangibly stored on a non-transient computer-readable medium and includes machine-executable instructions. The machine-executable instructions, when executed, cause a machine to execute an action, the action including: receiving, at a first data protection server among a plurality of data protection servers of a data protection network for backing up data, a first lock request for a first backup of a first piece of data stored in a storage server from a second data protection server among the plurality of data protection servers, the first lock request being used for requesting execution of a lock operation preventing the first backup from being tampered with and comprising an attribute value of an attribute of the lock operation; creating a lock attribute record based on the first lock request, the plurality of data protection servers reaching a consensus on the lock attribute record; and sending a response that is for the first lock request and is associated with the lock attribute record to the second data protection server.

The Summary of the Invention is provided to introduce a selection of concepts in a simplified form, which will be further described in the Detailed Description below. The Summary of the Invention is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, the same or corresponding numerals represent the same or corresponding parts.

DETAILED DESCRIPTION

Figure 1:
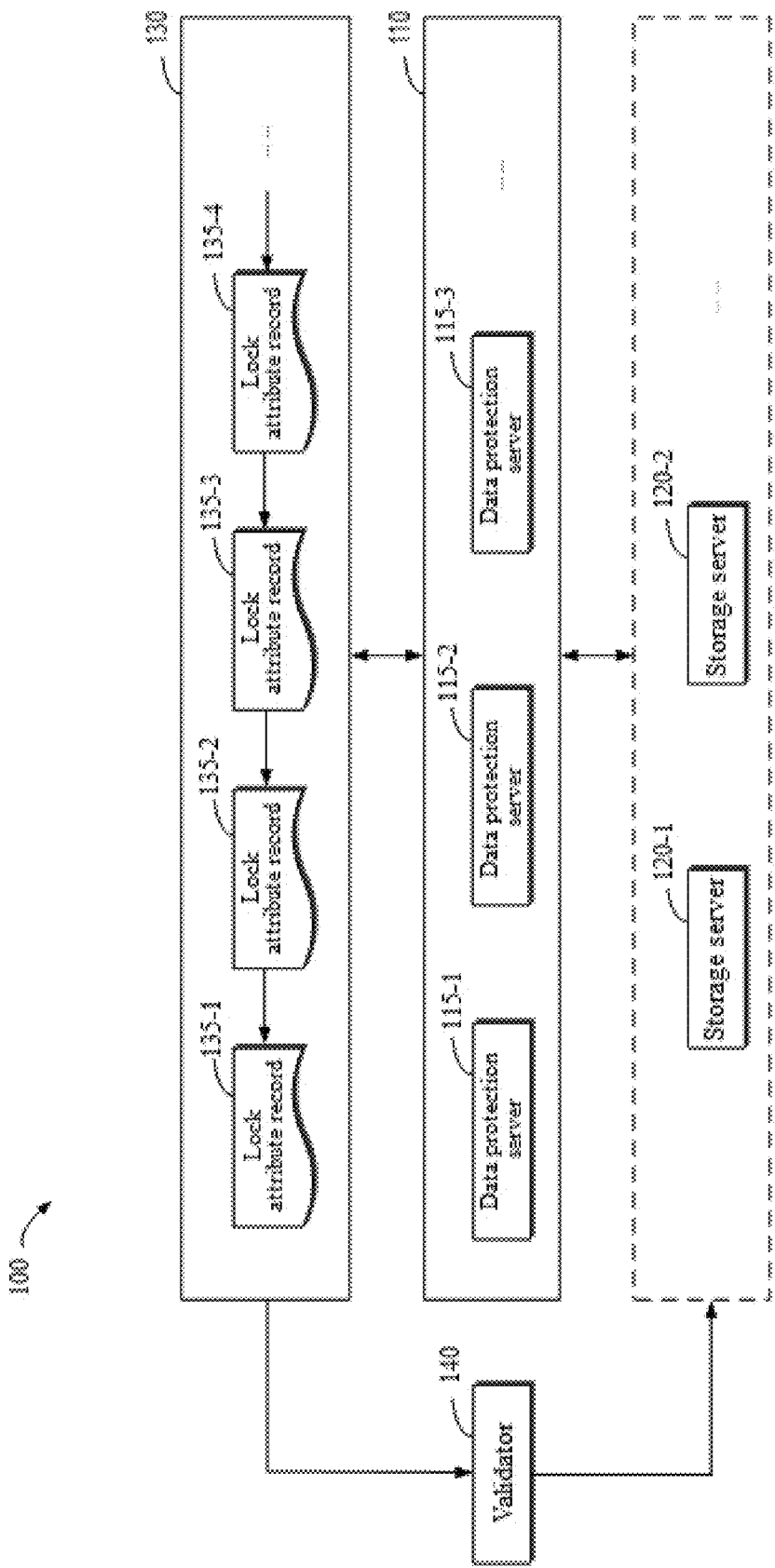
FIG. 1 shows a schematic diagram of an example of a storage management environment according to some embodiments of the present disclosure.

Preferred embodiments of the present disclosure will be described in more detail below with reference to the accompanying drawings. While the preferred embodiments of the present disclosure are shown in the accompanying drawings, it should be understood that the present disclosure can be implemented in various forms and should not be limited to the embodiments set forth herein. In contrast, these embodiments are provided to make the present disclosure more thorough and complete, and fully convey the scope of the present disclosure to those skilled in the art.

The term "including" and variants thereof used herein indicate open-ended inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, an efficient manner is required to improve the reliability of the retention lock technology to better prevent data from being tampered with. In a conventional data protection solution, both a data protection application and a storage device are located locally. The data protection application uses a designated parameter (for example, a backup identifier, a storage position, or retention time) to trigger a retention lock operation, and the storage device ensures the invariability of data. For example, a retention time attribute of a file may be used to keep the file invariable within designated retention time. Because both the data protection application and the storage device are local and controllable, the retention lock operation is reliable and credible. This retention lock solution is highly reliable, but is not adapted to modern information technologies with large-scale growth of data because a remote storage server such as cloud is not integrated.

In another conventional data protection solution, data is no longer limited to being stored in a local physical data protection server. Instead, the remote storage server such as cloud is used for storing cold data or archived data. For example, data stored on a primary storage system may be automatically moved into the remote storage server based on a predetermined policy. Remote storage service providers also become aware of the importance of corporate governance and regulatory compliance standards. Therefore, many remote storage service providers provide their own retention lock solutions. However, because it is difficult to know about a specific implementation of a retention lock solution of each remote storage service provider, an efficient and reliable manner is required to validate whether a retention lock operation on the remote storage server works as expected. In addition, various remote storage servers may be used in the another conventional data protection solution, and therefore how to implement unified and credible retention lock management is of vital importance.

Such retention lock management is faced with the following challenges. In an aspect, a retention lock configuration kept on the remote storage server may be tampered with, and therefore a desired data protection solution should keep a universal structural copy of the retention lock configuration to validate retention lock configurations acquired from different remote storage servers, thus validating whether a remote storage server executes an expected retention lock operation. In another aspect, the retention lock configuration kept by the data protection solution may also be tampered with, and therefore it is necessary to ensure that the retention lock configuration itself is also invariable.

According to the example embodiments of the present disclosure, a solution of improving storage management is presented. In this solution, at a data protection server among a plurality of data protection servers of a data protection network for backing up data, a lock request for a backup of the data stored in a storage server is received from another data protection server among the plurality of data protection servers. The lock request is used for requesting execution of a lock operation preventing the backup from being tampered with and includes an attribute value of an attribute of the lock operation. The data protection server creates, based on the lock request, a lock attribute record on which the plurality of data protection servers reaches a consensus, and sends a response that is for the lock request and is associated with the lock attribute record to the another data protection server.

Further, a validator acquires a lock attribute record in a lock attribute record chain from the data protection network. The plurality of data protection servers of the data protection network reaches a consensus on the lock attribute record chain. The lock attribute record includes an attribute value of an attribute of the lock operation. The lock operation is used for preventing the backup of the data stored in the storage server from being tampered with. The validator acquires the attribute value of the attribute of the lock operation from the storage server based on the lock attribute record, and generates an alarm indicating that the backup is tampered with in the case of determining that the attribute value in the lock attribute record does not match the attribute value acquired from the storage server.

In this manner, this solution not only can overcome the restriction of storing data locally, but also can overcome the risk that the data is tampered with on the remote storage server. The plurality of data protection servers of the data protection network reaches a consensus on the lock attribute record and the lock attribute record chain formed by the lock attribute record, such that credible lock operation management that is low-cost, invariable, and validatable can be implemented. In addition, such credible lock operation management is separated from the remote storage server that stores data, so that such a remote storage server can be added to implement seamless extension as long as the newly added remote storage server supports the lock operation. Thus, the reliability of storage management can be improved, and better user experience can be provided.

Specific examples of this solution will be described in more detail below with reference to FIG. 1 to FIG. 6. FIG. 1 shows a schematic diagram of an example of storage management environment 100 according to some embodiments of the present disclosure. Storage management environment 100 includes data protection network 110 for backing up data. Data protection network 110 includes a plurality of data protection servers, for example, data protection servers 115-1 to 115-3 (collectively referred to as "data protection servers 115" below). Data protection servers 115 may include, but are not limited to, any device having a computing power, such as a mainframe computer, a data protection server, an edge computing node, a personal computer, a desktop computer, a laptop computer, a tablet computer, and a personal digital assistant.

Data protection network 110 is connected to a plurality of storage servers, for example, storage servers 120-1 to 120-2 (collectively referred to as "storage servers 120" below), and stores a backup of data in these storage servers 120. Storage server 120 may be a local storage server or a remote storage server such as cloud. Storage server 120 may execute a lock operation on the backup of the data stored therein and store an attribute value of an attribute of the executed lock operation. Implementations of the lock operation on different storage servers 120 may be different.

To ensure that the lock operation executed by storage server 120 is not tampered with and thereby to ensure that the backup of the data stored on storage server 120 is not tampered with, data protection network 110 may create and store lock attribute record chain 130. Lock attribute record chain 130 includes a plurality of lock attribute records, for example, lock attribute records 135-1 to 135-4 (collectively referred to as "lock attribute records 135" below). Lock attribute records 135 include the attribute value of the attribute of the lock operation. The plurality of data protection servers 115 of the data protection network reaches a consensus on lock attribute record chain 130, which is credible and invariable as a consequence. For example, lock attribute record chain 130 may be a blockchain, and lock attribute record 135 may be a block in the blockchain.

In some embodiments, the plurality of data protection servers 115 needs to reach a consensus on lock attribute record chain 130. Therefore, these data protection servers 115 need to be authorized and are added to data protection network 110 as authorized data protection servers 115. Data protection server 115 may be authorized in various manners, for example, a white list or a certificate.

Taking a certificate authorization manner as an example, data protection server 115 may send a certificate signing request to a trusted certificate authority. The trusted certificate authority may sign a requested certificate using a root certificate of the trusted certificate authority. Data protection server 115 with a signed certificate may become authorized data protection server 115. Each authorized data protection server 115 may communicate with each other by sending a certificate. Data protection server 115 of a receiver may validate the certificate using the root certificate of the trusted certificate authority, and then perform communication. With such access control, only authorized data protection server 115 can be involved in operations, such as synchronizing lock attribute record chain 130 or creating lock attribute record 135.

Further, to validate whether a lock operation is tampered with, storage management environment 100 further includes validator 140. Validator 140 can acquire lock attribute record 135 in lock attribute record chain 130 from data protection network 110. Lock attribute record 135 includes the attribute value of the attribute of the lock operation. In addition, validator 140 may further acquire the attribute value of the attribute of the lock operation to which lock attribute record 135 is specific from storage server 120. Thus, validator 140 may compare the attribute value of the attribute of the lock operation from data protection network 110 with an attribute value of the same attribute of the lock operation acquired from storage server 120, thereby determining whether the lock operation on storage server 120 is tampered with.

For example, shortening retention time of the lock operation (which is a duration for which the lock operation is to last) generally means that the data may be modified within a shorter time, thus reducing the security of data backup. Therefore, it is not permitted and is considered illegal to shorten the retention time. In this case, if the retention time of the lock operation acquired from data protection network 110 is 3 years, and the retention time of the lock operation acquired from storage server 120 is 2 years, then validator 140 may generate an alarm indicating that the backup is tampered with.

It should be understood that for clarity, FIG. 1 only shows specific numbers of data protection servers 115, storage servers 120, and lock attribute records 135. However, the numbers of these elements are not limited to the specific numbers, and may be any appropriate numbers. In addition, while validator 140 is described herein as being located outside data protection network 110, the implementation of validator 140 is not limited to this position, and may be located inside data protection network 110. In addition, while a verification operation is described herein as being implemented in validator 140, the validation operation may also be implemented in data protection server 115 of data protection network 110.

In this manner, the plurality of data protection servers 115 of data protection network 110 reaches a consensus on lock attribute record 135 and lock attribute record chain 130 formed by the lock attribute record, and whether the attribute value of the lock operation on storage server 120 matches the attribute value of the lock operation included in lock attribute record 135 is validated, such that credible lock operation management that is low-cost, invariable, and validatable can be implemented.

Figure 3:
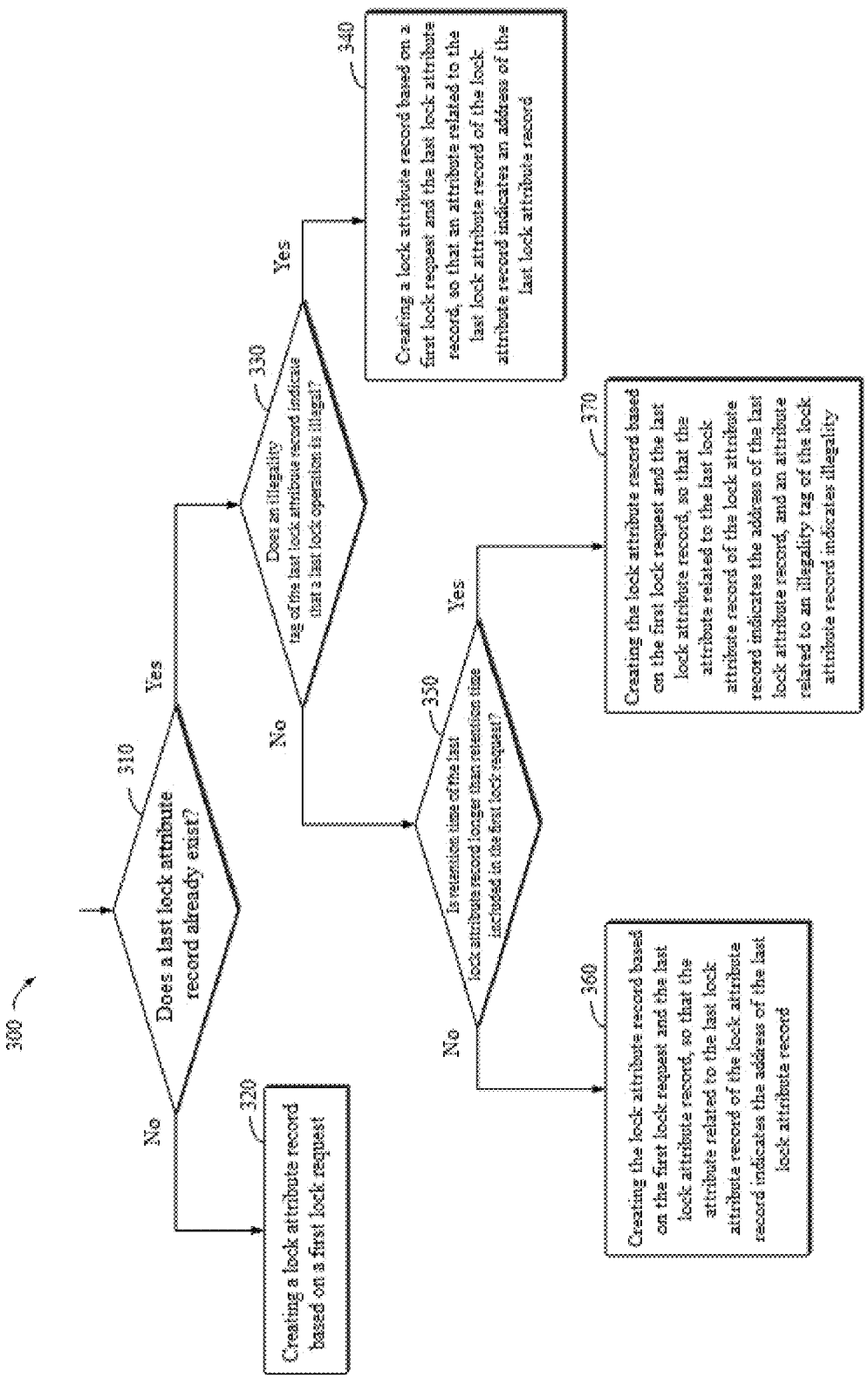
FIG. 3 shows a storage management example of creating a lock attribute record according to some embodiments of the present disclosure.
Figure 4:
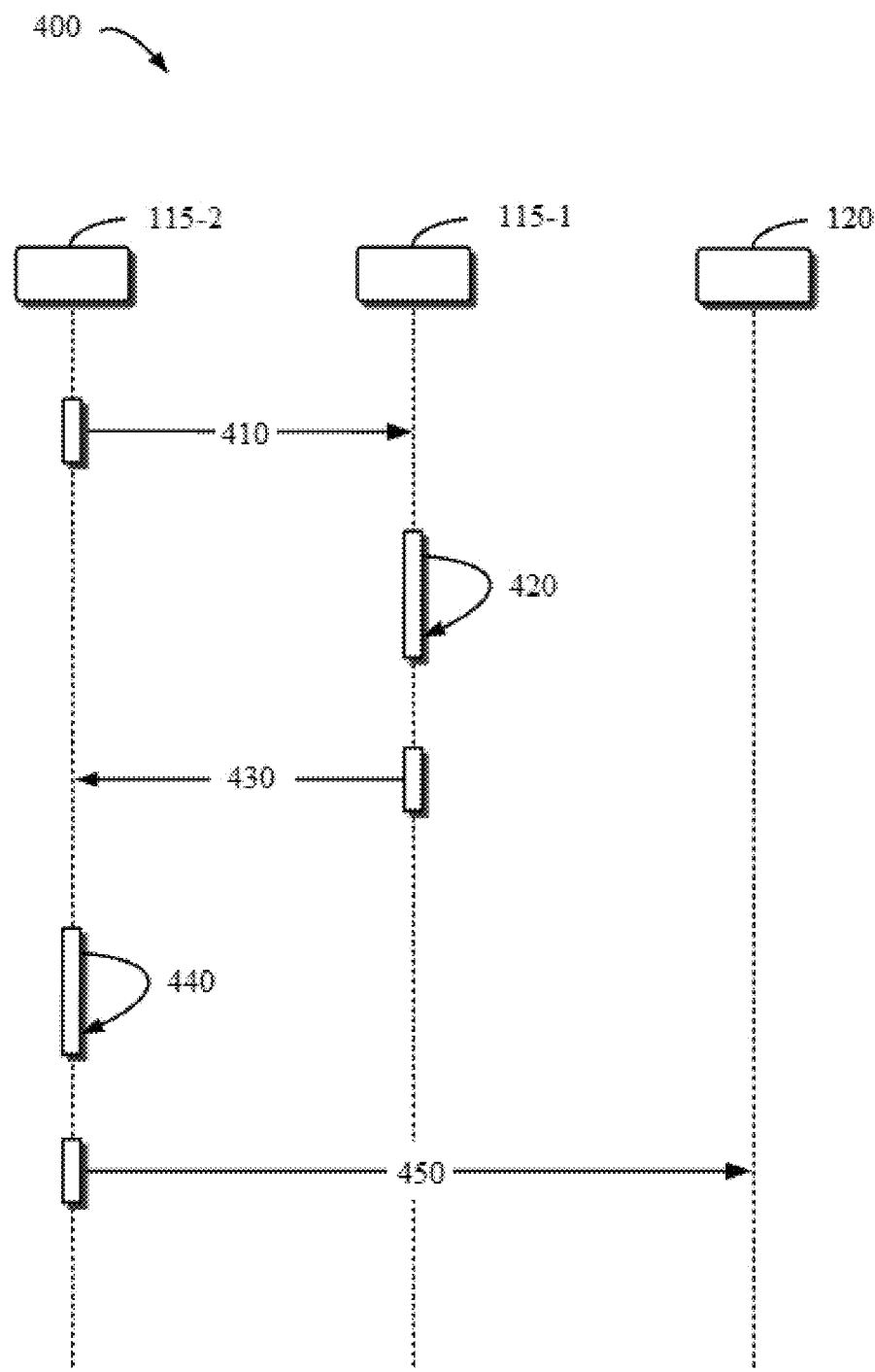
FIG. 4 shows a storage management example of executing a lock operation according to some embodiments of the present disclosure.

An action of creating and storing lock attribute record 135 by data protection network 110 and an action of causing storage server 120 to execute the lock operation will be first described below with reference to FIG. 2-FIG. 4, and then a validation operation executed by validator 140 will be described with reference to FIG. 5.

Figure 2:
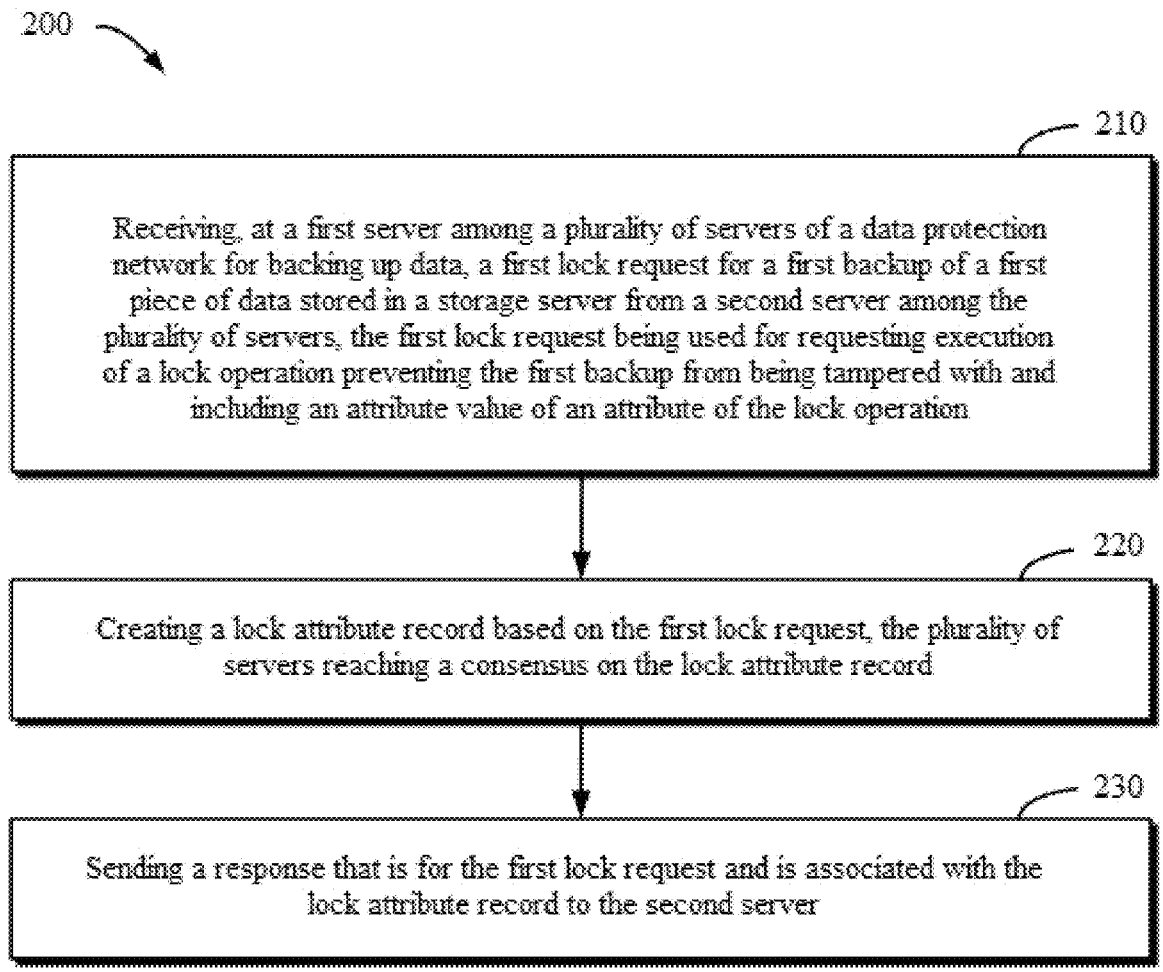
FIG. 2 shows a flowchart of a method for storage management according to some embodiments of the present disclosure.

FIG. 2 shows a flowchart of method 200 for storage management according to some embodiments of the present disclosure. Method 200 may be, for example, implemented at data protection server 115 shown in FIG. 1. For ease of discussion, method 200 will be described below with reference to FIG. 1. It should be understood that method 200 may further include additional steps that are not shown and/or may omit steps that are shown. The scope of the present disclosure is not limited in this regard.

In 210, receiving, at a data protection server (for example, data protection server 115-1) among a plurality of data protection servers 115 of data protection network 110 for backing up data, a lock request for a backup of data stored in storage server 120 (for example, storage server 120-1) from another data protection server (e.g., data protection server 115-2) among the plurality of data protection servers 115. The lock request is used for requesting execution of a lock operation preventing the backup from being tampered with and includes an attribute value of an attribute of the lock operation.

Data protection server 115-1 serves as a data protection server creating lock attribute record 135, and data protection server 115-2 serves as a data protection server sending the lock request, which will be taken as an example for description below. However, it should be understood that any data protection server 115 in data protection network 110 may serve as a data protection server creating lock attribute record 135. Likewise, any data protection server 115 in data protection network 110 may also serve as a data protection server sending the lock request.

The lock request may include various attributes of the lock operation. These attributes include, but are not limited to, e.g., a data protection server identifier, a lock role, a backup identifier, a backup hash value, a storage identifier, a lock mode, holding time, and a timestamp. The data protection server identifier represents an identifier, for example, "115-2," of a data protection server (for example, data protection server 115-2) among the plurality of data protection servers 115 that initiates the backup. The lock role represents a role that executes the lock operation, for example, a user or an administrator. The backup identifier represents an identifier, for example, "001," of the backup. The backup hash value represents a value obtained by hashing the backup. The storage identifier represents an identifier, for example, "120-1," of the storage server (for example, storage server 120-1). The lock mode represents a mode used by the lock operation, for example, corporate governance or regulatory compliance standards. The holding time represents a duration, e.g., 1 month, for which the lock operation is to last. The timestamp represents time, for example, 12:00:00, Feb. 24, 2020, when lock attribute record 135 is created.

In 220, data protection server 115-1 creates lock attribute record 135 based on the lock request. Lock attribute record 135 includes the attribute value of the attribute of the lock operation. Lock attribute record 135 may represent the lock operation on the backup and is used for validating the reliability of the lock operation. For example, whether the backup on which the lock operation is performed is modified or deleted may be detected based on lock attribute record 135. Whether retention time of the backup on which the lock operation is performed is shortened may be further detected based on lock attribute record 135. Correspondingly, if the retention time of the backup on which the lock operation is performed is extended, the lock operation that extends the retention time may also be recorded by using lock attribute record 135. In addition, when more storage servers 120 are added into storage management environment 100, the implementation of lock attribute record 135 may be adapted to newly added storage server 120 after making a few changes only or no changes at all, so that entire storage management environment 100 is extendable.

Thus, in some embodiments, lock attribute record 135 may include attributes listed below. For example, besides the data protection server identifier, lock role, backup identifier, backup hash value, storage identifier, lock mode, holding time, and timestamp included in the lock request described above, attributes included in lock attribute record 135 may further include a last lock attribute record and an illegality tag. The last lock attribute record represents an address of lock attribute record 135 of a last lock operation for the backup. The illegality tag indicates whether the lock operation is illegal. The illegality is, for example, that holding time of the lock operation is shortened relative to the last lock operation.

In some embodiments, data protection server 115-1 may use the attribute value of the attribute of the lock operation included in the lock request to fill lock attribute record 135. It can be seen that attribute values of an attribute of the last lock attribute record and an attribute of the illegality tag need to be further determined to create lock attribute record 135 based on the lock request. A process of creating lock attribute record 135 will be described below with reference to FIG. 3. FIG. 3 shows storage management example 300 of creating lock attribute record 135 according to some embodiments of the present disclosure.

In 310, data protection server 115-1 can determine whether last lock attribute record 135 of a last lock operation for a backup already exists in lock attribute record chain 130 stored at data protection server 115-1. For example, data protection server 115-1 can search for last lock attribute record 135 based on a backup identifier and a server identifier.

In the case of determining that last lock attribute record 135 does not exist, in 320, data protection server 115-1 can create lock attribute record 135 based on a lock request. As mentioned above, data protection server 115-1 may use an attribute value of an attribute of a lock operation included in the lock request to fill lock attribute record 135. In addition, because last lock attribute record 135 does not exist, an attribute value of an attribute of the last lock attribute record in created lock attribute record 135 may be set to a predetermined value, for example, NULL. Further, because data protection server 115-2 requests the lock operation for the backup for the first time, there is no modification to the lock operation or no modification to the backup on which the lock operation is performed. In this case, the lock operation is legal, and therefore an attribute value of an attribute of an illegality tag in created lock attribute record 135 is set to be non-illegal.

In the case of determining that last lock attribute record 135 exists, in 330, data protection server 115-1 may further determine whether the illegality tag of last lock attribute record 135 indicates that the last lock operation is illegal. In the case of determining that the last lock operation is illegal, in 340, data protection server 115-1 may create lock attribute record 135 based on the lock request and last lock attribute record 135. As mentioned above, in some embodiments, data protection server 115-1 may use the attribute value of the attribute of the lock operation included in the lock request to fill lock attribute record 135. In addition, because last lock attribute record 135 exists, the attribute value of the attribute of the last lock attribute record in created lock attribute record 135 may be set to an address of last lock attribute record 135, so that created lock attribute record 135 may point to last lock attribute record 135. In addition, because the last lock operation is illegal, whether a requested lock operation is illegal cannot be determined. In this case, the attribute value of the attribute of the illegality tag in created lock attribute record 135 may be set to be non-illegal.

In the case of determining that the last lock operation is non-illegal, in 350, data protection server 115-1 may determine whether retention time of last lock attribute record 135 is longer than retention time included in the lock request. In the case of determining that the retention time of last lock attribute record 135 is shorter than the retention time included in the lock request, in 360, data protection server 115-1 may create lock attribute record 135 based on the lock request and last lock attribute record 135. As mentioned above, in some embodiments, data protection server 115-1 may use the attribute value of the attribute of the lock operation included in the lock request to fill lock attribute record 135. In addition, because last lock attribute record 135 exists, the attribute value of the attribute of the last lock attribute record in created lock attribute record 135 may be set to the address of last lock attribute record 135, so that created lock attribute record 135 may point to last lock attribute record 135. Further, because the retention time of the lock operation requested by the lock request is not shortened relative to the last lock operation, the attribute value of the attribute of the illegality tag in created lock attribute record 135 may be set to be non-illegal.

In the case of determining that the retention time of last lock attribute record 135 is longer than the retention time included in the lock request, in 370, data protection server 115-1 may create lock attribute record 135 based on the lock request and last lock attribute record 135. As mentioned above, in some embodiments, data protection server 115-1 may use the attribute value of the attribute of the lock operation included in the lock request to fill lock attribute record 135. In addition, because the retention time of the lock operation requested by the lock request is shortened relative to the last lock operation, the attribute value of the attribute of the illegality tag in created lock attribute record 135 may be set to be illegal. In some embodiments, illegal lock attribute record 135 may still be added into lock attribute record chain 130 for future validation and examination. The validation and examination executed by validator 140 will be described below with reference to FIG. 5.

It should be understood that while only data protection server 115-1 creating lock attribute record 135 is described above, in fact, each data protection server 115 in data protection network 110 has created lock attribute record 135. Each data protection server 115 in data protection network 110 will reach a consensus on created lock attribute record 135, for example, by using a selected Byzantine Fault Tolerance (BFT) consensus mechanism, for example, a distributed consistency algorithm such as Proof of State, Paxos or Raft. In this manner, each data protection server 115 in data protection network 110 only adds lock attribute record 135 on which a consensus is reached into lock attribute record chain 130.

Referring back to FIG. 2, in 230, data protection server 115-1 sends a response that is for the lock request and is associated with lock attribute record 135 to data protection server 115-2, so that the lock operation may be executed based on the response.

A process of creating lock attribute record 135 by data protection server 115-1 is described above. In some embodiments, a process of creating lock attribute record 135 is a part of a process of executing the lock operation. A complete process of executing operations by different subjects to execute the lock operation will be described in detail below. FIG. 4 shows storage management example 400 of executing a lock operation according to some embodiments of the present disclosure.

In 410, data protection server 115-2 may send a lock request for a backup of data stored in storage server 120 to data protection server 115-1 among the plurality of data protection servers 115. In some embodiments, when a lock role such as a user or an administrator triggers the lock operation for the backup on data protection server 115-2, an attribute value of the lock operation will not be directly recorded on data protection server 115-2. Instead, data protection server 115-2 generates a lock request filled with the attribute value of the lock operation, and sends the lock request to data protection network 110.

In 420, after receiving the lock request, data protection server 115-1 may create lock attribute record 135 based on the lock request. As mentioned above, while data protection server 115-1 is described as receiving the lock request and creating lock attribute record 135, in fact, each data protection server 115 in data protection network 110 has received the lock request and creates lock attribute record 135.

Then, data protection network 110 sends a response that is for the lock request and is associated with lock attribute record 135 to data protection server 115-2. For example, in 430, data protection server 115-1 sends a response for lock attribute record 135 created for a requested lock operation to data protection server 115-2.

In 440, data protection server 115-2 may determine whether the lock request is successful and non-illegal after receiving the response. In 450, after determining that the lock request is successful and non-illegal, data protection server 115-2 may send a request to storage server 120 (for example, storage server 120-1) to trigger storage server 120-1 to execute a lock operation on the backup.

As mentioned above, data protection network 110 has created and stored lock attribute record 135 and caused storage server 120 to execute the lock operation. How to validate whether such a lock operation is tampered with will be described below. A validation operation may be triggered by using a conventional maintenance window or may be triggered as required.

Figure 5:
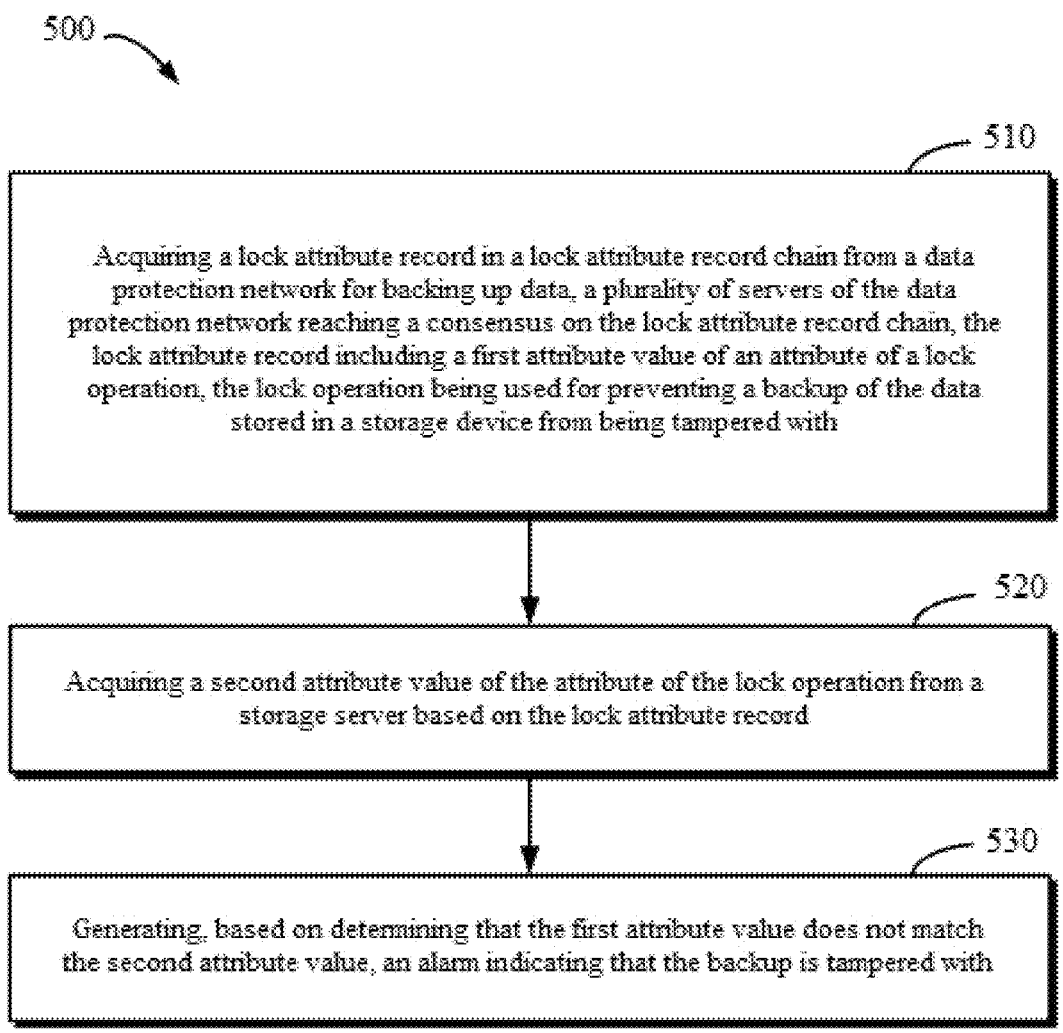
FIG. 5 shows a flowchart of another method for storage management according to some embodiments of the present disclosure.

FIG. 5 shows a flowchart of another method 500 for storage management according to some embodiments of the present disclosure. Method 500 may be, for example, implemented at validator 140 shown in FIG. 1. For ease of discussion, method 500 will be described below with reference to FIG. 1. It should be understood that method 500 may further include additional steps that are not shown and/or may omit steps that are shown. The scope of the present disclosure is not limited in this regard.

In 510, validator 140 acquires lock attribute record 135 in lock attribute record chain 130 from data protection network 110 for backing up data. As mentioned above, the plurality of data protection servers 115 of data protection network 110 reaches a consensus on lock attribute record chain 130. Lock attribute record 135 includes an attribute value of an attribute of a lock operation. The lock operation is used for preventing a backup of the data stored in storage server 120 from being tampered with.

In some embodiments, lock attribute record 135 may include, but is not limited to, a data protection server identifier, a lock role, a backup identifier, a backup hash value, a storage identifier, a lock mode, holding time and a timestamp, a last lock attribute record, and an illegality tag. Because an attribute of lock attribute record 135 has been described in detail above, the description of the attribute is omitted here.

For example, because retention time of the lock operation is extended, a series of historical lock operations of the backup are recorded in lock attribute record chain 130. In these historical lock operations, a lock operation with the latest time indicated by a timestamp is a current lock operation for the backup. Therefore, lock attribute record 135 of the current lock operation contains to-be-validated valid information. Thus, lock attribute record 135 of the current lock operation needs to be found. In some embodiments, validator 140 may acquire a plurality of candidate lock attribute records 135 for the backup in lock attribute record chain 130 from data protection network 110, and may determine a candidate lock attribute record with the time indicated by the timestamp exceeding a time threshold among the plurality of candidate lock attribute records as the lock attribute record.

For example, validator 140 may acquire at least one lock attribute record 135 from lock attribute record chain 130, and acquire, from lock attribute record 135, information associated with a corresponding backup, for example, information for identifying the backup such as a storage server identifier, a data protection server identifier, and a backup identifier. Because lock attribute record 135 itself keeps an address of last lock attribute record 135, it is only necessary to acquire one lock attribute record 135 of the backup, so that a complete list of lock attribute records 135 of the backup may be established very rapidly based on the information for identifying the backup in the lock attribute record. Therefore, validator 140 may acquire the latest lock attribute record in the complete list for validation.

In 520, validator 140 acquires an attribute value of an attribute of a lock operation from storage server 120 (for example, storage server 120-1) based on lock attribute record 135. In some embodiments, validator 140 may extract a data protection server identifier and a backup identifier of the backup and a storage identifier of storage server 120-1 from lock attribute record 135. Then, validator 140 may acquire the attribute value of the attribute of the lock operation for the backup from storage server 120-1 based on the data protection server identifier, the backup identifier, and the storage identifier.

In 530, in the case of determining that the attribute value acquired from data protection network 110 does not match the attribute value acquired from storage server 120, validator 140 generates an alarm indicating that the backup is tampered with to take a remedial action. For example, if the retention time of the lock operation acquired from data protection network 110 is 3 years, and the retention time of the lock operation acquired from storage server 120 is 2 years, then validator 140 may generate the alarm indicating that the backup is tampered with.

In addition, in some embodiments, validator 140 may determine information associated with an attempted illegal lock operation from lock attribute record 135 indicated by the illegality tag to be illegal. While the illegal lock operation will not be executed on storage server 120, illegal lock attribute record 135 is also recorded in lock attribute record chain 130 to identify an accidental operation shortening the retention time of the lock operation. During validation, validator 140 may further acquire these illegal lock attribute records 135 from data protection network 110. Because the illegality tag of the illegal lock attribute record 135 is set to be illegal, validator 140 may very easily select illegal lock attribute record 135 from the complete list of acquired lock attribute records 135 for the backup for examination. The timestamp and the lock role recorded in illegal lock attribute record 135 may contribute to analyzing when and who attempts to corrupt the backup of the data.

In this manner, this solution not only can overcome the restriction of storing data locally, but also can overcome the risk that the data is tampered with on the remote storage server. The plurality of data protection servers of the data protection network reaches a consensus on the lock attribute record and the lock attribute record chain formed by the lock attribute record, such that credible lock operation management that is low-cost, invariable, and validatable can be implemented. In addition, such credible lock operation management is separated from the remote storage server that stores data, so that such a remote storage server can be added to implement seamless extension as long as the newly added remote storage server supports the lock operation. Thus, the reliability of storage management can be improved, and better user experience can be provided.

Figure 6:
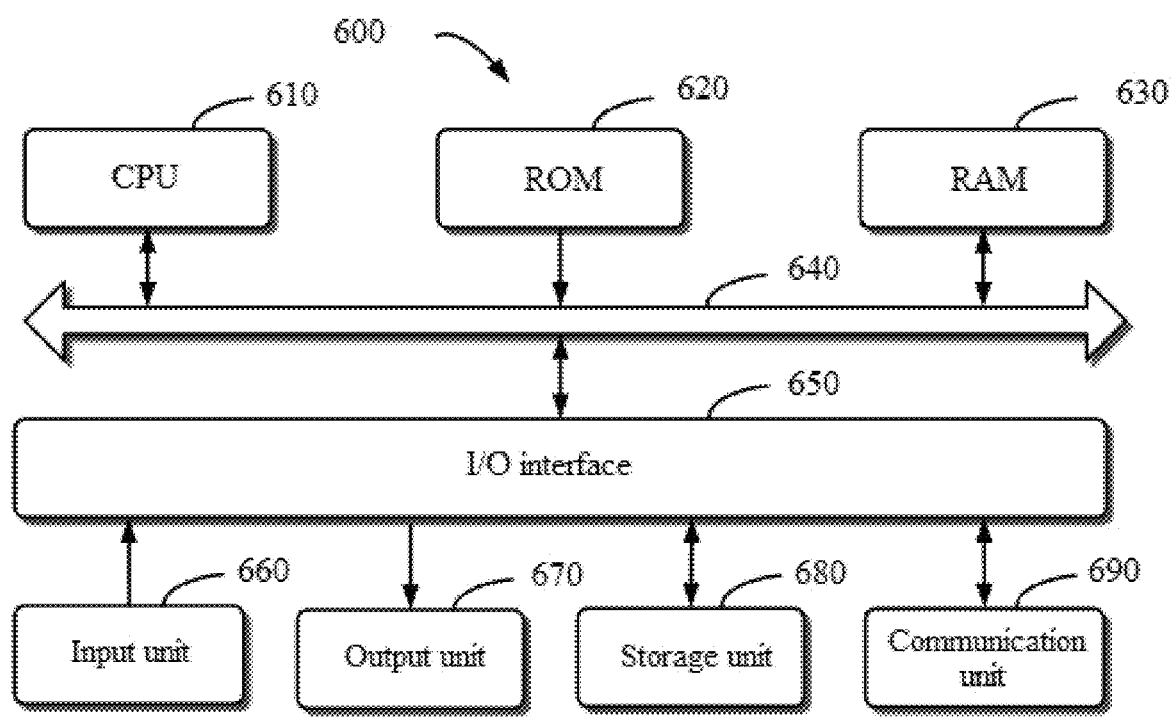
FIG. 6 shows a schematic block diagram of an example device that may be configured to implement embodiments of the present disclosure.

FIG. 6 shows a schematic block diagram of example device 600 that may be configured to implement embodiments of the present disclosure. For example, data protection servers 115 and validator 140 shown in FIG. 1 may be implemented by device 600. As shown in the figure, device 600 includes central processing unit (CPU) 610, which may execute various appropriate actions and processing in accordance with computer program instructions stored in read-only memory (ROM) 620 or computer program instructions loaded onto random access memory (RAM) 630 from storage unit 680. RAM 630 may further store various programs and data required for operations of device 600. CPU 610, ROM 620, and RAM 630 are connected to each other through bus 640. Input/output (I/O) interface 650 may also be connected to bus 640.

A plurality of components in device 600 are connected to I/O interface 650, including: input unit 660, such as a keyboard and a mouse; output unit 670, such as various types of displays and speakers; storage unit 680, such as a magnetic disk and an optical disk; and communication unit 690, such as a network card, a modem, and a wireless communication transceiver. Communication unit 690 allows device 600 to exchange information/data with other devices via a computer network such as the Internet and/or various telecommunication networks.

The processes and processing described above, such as methods 200-500, may be executed by processing unit 610. For example, in some embodiments, methods 200-500 may be embodied as a computer software program that is tangibly included in a machine-readable medium, such as storage unit 680. In some embodiments, some of or all the computer program can be loaded into and/or installed onto device 600 via ROM 620 and/or communication unit 690. When the computer program is loaded into RAM 630 and executed by CPU 610, one or more actions of methods 200-500 described above may be executed.

The present disclosure may be a method, an apparatus, a system and/or a computer program product. The computer program product may include a computer-readable storage medium with computer-readable program instructions for executing various aspects of the present disclosure loaded thereon.

The computer-readable storage medium may be a tangible device that can retain, and store instructions used by an instruction executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or in-groove protruding structures with instructions stored thereon, and any suitable combination thereof. The computer-readable storage medium used herein is not construed as transient signals themselves, such as radio waves or other freely propagated electromagnetic waves, electromagnetic waves propagated through waveguides or other transmission media (e.g., optical pulses through fiber-optic cables), or electrical signals transmitted through electrical wires.

The computer-readable program instructions described here can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcodes, firmware instructions, state setting data, or source codes or object codes written in any combination of one or more programming languages. The programming languages include object-oriented programming languages, such as Smalltalk or C++, and also include conventional procedural programming languages, such as "C" language or similar programming languages. The computer-readable program instructions can be executed entirely on a user computer, partly on a user computer, as a separate software package, partly on a user computer and partly on a remote computer, or entirely on a remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The computer-readable program instructions may be executed by the electronic circuit to implement various aspects of the present disclosure.

Various aspects of the present disclosure are described here with reference to the flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause the computer, the programmable data processing apparatus, and/or another device to operate in a particular manner, such that the computer-readable medium storing the instructions includes a manufactured product, which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the system, the method, and the computer program product according to a plurality of embodiments of the present disclosure. In this regard, each block in the flowcharts or block diagrams may represent a module, a program segment, or part of an instruction, said module, program segment, or part of an instruction including one or more executable instructions for implementing specified logical functions. In some alternative implementations, the functions denoted in the blocks may occur in a sequence different from that shown in the figures. For example, any two blocks presented in succession may actually be executed substantially in parallel, or may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various illustrated embodiments. The selection of terms used herein is intended to best explain the principles and practical applications of the embodiments or technological improvements of the technologies on the market, or to enable other persons of ordinary skills in the art to understand the embodiments disclosed herein.

The invention claimed is:

1. A method for storage management, comprising:
  acquiring a lock attribute record in a lock attribute record blockchain from a data protection network for backing up data, the data protection network including a plurality of data protection servers that reach a consensus on the lock attribute record blockchain, the lock attribute record comprising a first attribute value of an attribute of a lock operation, the lock operation being used for preventing a backup of the data stored in a storage server from being tampered with, the lock attribute record being a block in the lock attribute record blockchain, the first attribute value comprising a first retention time of the lock operation, the first retention time generated by one the plurality of data protection servers;
  acquiring, based on the lock attribute record, a second attribute value of the attribute of the lock operation from the storage server, the second attribute value comprising a second retention time of the lock operation; and
  generating, based on determining that the first retention time does not match the second retention time, an alarm indicating that the backup is tampered with;
  wherein the attribute comprises a timestamp representing a time at which the lock attribute record is created; and
  wherein acquiring the lock attribute record comprises:
  acquiring a plurality of candidate lock attribute records for the backup in the lock attribute record blockchain from the data protection network, and
  determining a candidate lock attribute record with the time indicated by the timestamp exceeding a time threshold among the plurality of candidate lock attribute records as the lock attribute record.

2. The method according to claim 1, wherein the attribute further comprises at least one of following items:
  a data protection server identifier representing an identifier of a data protection server that initiates the backup among the plurality of data protection servers;
  a lock role representing a role that executes the lock operation;
  a backup identifier representing an identifier of the backup;
  a backup hash value representing a value obtained by hashing the backup;
  a storage identifier representing an identifier of the storage server;
  a lock mode representing a mode used by the lock operation;
  a last lock attribute record representing an address of a lock attribute record of a last lock operation for the backup; and
  an illegality tag indicating whether the lock operation is illegal, the illegality tag comprising a retention time being shortened relative to the last lock operation.

3. The method according to claim 2, wherein acquiring the second attribute value comprises:
  extracting the data protection server identifier and the backup identifier of the backup and the storage identifier of the storage server from the lock attribute record; and
  acquiring the second attribute value of the attribute of the lock operation for the backup from the storage server based on the data protection server identifier, the backup identifier, and the storage identifier.

4. The method according to claim 1, further comprising:
  determining information associated with an attempted illegal lock operation from a candidate lock attribute record indicated by an illegality tag to be illegal among the plurality of candidate lock attribute records.

5. The method according to claim 1, wherein the attribute further comprises at least one of following items:
  a data protection server identifier representing an identifier of a data protection server that initiates the backup among the plurality of data protection servers;
  a lock role representing a role that executes the lock operation; and
  a backup identifier representing an identifier of the backup.

6. The method according to claim 1, wherein the attribute further comprises at least one of following items:
  a backup hash value representing a value obtained by hashing the backup; and
  a storage identifier representing an identifier of the storage server.

7. The method according to claim 1, wherein the attribute further comprises at least one of following items:
  a lock mode representing a mode used by the lock operation; and
  a last lock attribute record representing an address of a lock attribute record of a last lock operation for the backup.

8. A method for storage management, comprising:
  receiving, at a first data protection server among a plurality of data protection servers of a data protection network for backing up data, a first lock request for a first backup of a first piece of data stored in a storage server from a second data protection server among the plurality of data protection servers, the first lock request being used for requesting execution of a lock operation preventing the first backup from being tampered with and comprising an attribute value of an attribute of the lock operation, the attribute value comprising a retention time of the lock operation;

creating a lock attribute record based on the first lock request, the plurality of data protection servers reaching a consensus on the lock attribute record, the lock attribute record comprising the retention time of the lock operation; and sending a response that is for the first lock request and is associated with the lock attribute record to the second data protection server;

wherein the attribute comprises at least a timestamp representing a time at which the lock attribute record is created; and wherein creating the lock attribute record comprises:

determining whether a last lock attribute record of a last lock operation for the first backup already exists in a lock attribute record blockchain which is stored at the first data protection server and on which the plurality of data protection servers reaches a consensus, and creating the lock attribute record based on the first lock request based on determining that the last lock attribute record does not exist.

9. The method according to claim 8, wherein the attribute further comprises at least one of following items:
a data protection server identifier representing an identifier of a data protection server that initiates the first backup among the plurality of data protection servers;
a lock role representing a role that executes the lock operation;
a backup identifier representing an identifier of the first backup;
a backup hash value representing a value obtained by hashing the first backup;
a storage identifier representing an identifier of the storage server storing the first backup; and
a lock mode representing a mode used by the lock operation.

10. The method according to claim 8, further comprising:
determining, based on determining that the last lock attribute record exists, whether an illegality tag of the last lock attribute record indicates that the last lock operation is illegal; and
creating, based on determining that the last lock operation is illegal, the lock attribute record based on the first lock request and the last lock attribute record, so that an attribute related to the last lock attribute record of the lock attribute record indicates an address of the last lock attribute record.

11. The method according to claim 10, further comprising:
determining, based on determining that the last lock operation is non-illegal, whether a retention time of the last lock attribute record is longer than the retention time included in the first lock request; and
creating, based on determining that the retention time of the last lock attribute record is shorter than the retention time included in the first lock request, the lock attribute record based on the first lock request and the last lock attribute record, so that the attribute related to the last lock attribute record of the lock attribute record indicates the address of the last lock attribute record.

12. The method according to claim 11, further comprising:
creating, based on determining that the retention time of the last lock attribute record is longer than the retention time included in the first lock request, the lock attribute record based on the first lock request and the last lock attribute record, so that the attribute related to the last lock attribute record of the lock attribute record indicates the address of the last lock attribute record, and an attribute of the lock attribute record related to the illegality tag indicates illegality.

13. The method according to claim 8, further comprising:
sending a second lock request for a second backup of a second piece of data stored in the storage server to a third data protection server among the plurality of data protection servers;
determining, based on determining that a response for the second lock request is received from the third data protection server, whether the second lock request is successful and non-illegal; and
causing, based on determining that the second lock request is successful and non-illegal, the storage server to execute a second lock operation on the second backup.

14. The method according to claim 8, further comprising:
adding the lock attribute record into the lock attribute record blockchain.

15. An electronic device, comprising:
at least one processing unit; and
at least one memory, the at least one memory being coupled to the at least one processing unit and storing instructions, which when executed by the at least one processing unit, cause the at least one processing unit to perform an action, the action comprising:
acquiring a lock attribute record in a lock attribute record blockchain from a data protection network for backing up data, the data protection network including a plurality of data protection servers that reach a consensus on the lock attribute record blockchain, the lock attribute record comprising a first attribute value of an attribute of a lock operation, the lock operation being used for preventing a backup of the data stored in a storage server from being tampered with, the lock attribute record being a block in the lock attribute record blockchain, the first attribute value comprising a first retention time of the lock operation, the first retention time generated by one the plurality of data protection servers;
acquiring, based on the lock attribute record, a second attribute value of the attribute of the lock operation from the storage server, the second attribute value comprising a second retention time of the lock operation; and
generating, based on determining that the first retention time does not match the second retention time, an alarm indicating that the backup is tampered with
wherein the attribute comprises at least a timestamp representing a time at which the lock attribute record is created; and
wherein acquiring the lock attribute record comprises:
acquiring a plurality of candidate lock attribute records for the backup in the lock attribute record blockchain from the data protection network, and
determining a candidate lock attribute record with the time indicated by the timestamp exceeding a time threshold among the plurality of candidate lock attribute records as the lock attribute record.

16. The device according to claim 15, wherein the attribute further comprises at least one of following items:
a data protection server identifier representing an identifier of a data protection server that initiates the backup among the plurality of data protection servers;

a lock role representing a role that executes the lock operation;

a backup identifier representing an identifier of the backup;

a backup hash value representing a value obtained by hashing the backup;

a storage identifier representing an identifier of the storage server;

a lock mode representing a mode used by the lock operation;

a last lock attribute record representing an address of a lock attribute record of a last lock operation for the backup; and an illegality tag indicating whether the lock operation is illegal, the illegality tag comprising a retention time being shortened relative to the last lock operation.

17. The device according to claim 15, wherein the action further comprises:

determining information associated with an attempted illegal lock operation from a candidate lock attribute record indicated by an illegality tag to be illegal among the plurality of candidate lock attribute records.

18. The device according to claim 16, wherein acquiring the second attribute value comprises:

extracting the data protection server identifier and the backup identifier of the backup and the storage identifier of the storage server from the lock attribute record; and acquiring the second attribute value of the attribute of the lock operation for the backup from the storage server based on the data protection server identifier, the backup identifier, and the storage identifier.

19. An electronic device, comprising:

at least one processing unit; and at least one memory, the at least one memory being coupled to the at least one processing unit and storing instructions, which when executed by the at least one processing unit, cause the at least one processing unit to perform an action, the action comprising:

receiving, at a first data protection server among a plurality of data protection servers of a data protection network for backing up data, a first lock request for a first backup of a first piece of data stored in a storage server from a second data protection server among the plurality of data protection servers, the first lock request being used for requesting execution of a lock operation preventing the first backup from being tampered with and comprising an attribute value of an attribute of the lock operation, the attribute value comprising a retention time of the lock operation;

creating a lock attribute record based on the first lock request, the plurality of data protection servers reaching a consensus on the lock attribute record, the lock attribute record comprising the retention time of the lock operation; and sending a response that is for the first lock request and is associated with the lock attribute record to the second data protection server;

wherein the attribute comprises at least a timestamp representing a time at which the lock attribute record is created; and wherein creating the lock attribute record comprises:

determining whether a last lock attribute record of a last lock operation for the first backup already exists in a lock attribute record blockchain which is stored at the first data protection server and on which the plurality of data protection servers reaches a consensus, and creating the lock attribute record based on the first lock request based on determining that the last lock attribute record does not exist.

20. The device according to claim 19, wherein the attribute further comprises at least one of following items:

a data protection server identifier representing an identifier of a data protection server that initiates the first backup among the plurality of data protection servers;

a lock role representing a role that executes the lock operation;

a backup identifier representing an identifier of the first backup;

a backup hash value representing a value obtained by hashing the first backup;

a storage identifier representing an identifier of the storage server storing the first backup; and a lock mode representing a mode used by the lock operation.

* * * * *